Sept. 27, 1966

H. SAUER 3,274,881

COMBINED VIEWFINDER AND RANGEFINDER WITH COMPOSITE
BIREFRINGEMENT PRISM ASSEMBLY
FOR PHOTOGRAPHIC CAMERAS

Filed Nov. 30, 1961

INVENTOR:
Hans Sauer,
BY Singer, Stern & Carlberg
Attorneys.

Sept. 27, 1966   H. SAUER   3,274,881
COMBINED VIEWFINDER AND RANGEFINDER WITH COMPOSITE
BIREFRINGEMENT PRISM ASSEMBLY
FOR PHOTOGRAPHIC CAMERAS
Filed Nov. 30, 1961   4 Sheets-Sheet 2
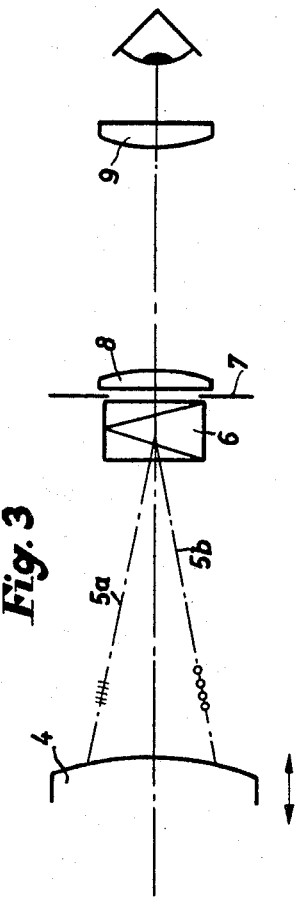
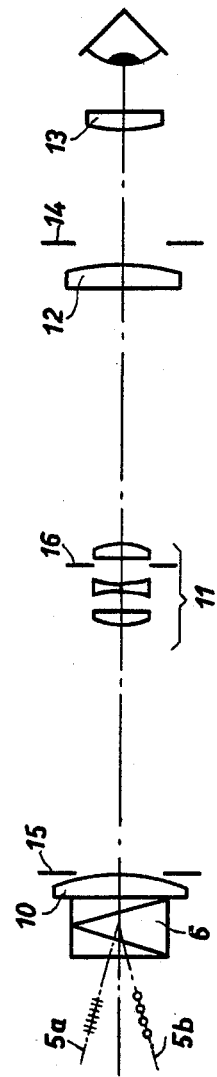
INVENTOR:
Hans Sauer,
BY Singer, Stern & Carlburg,
Attorneys.

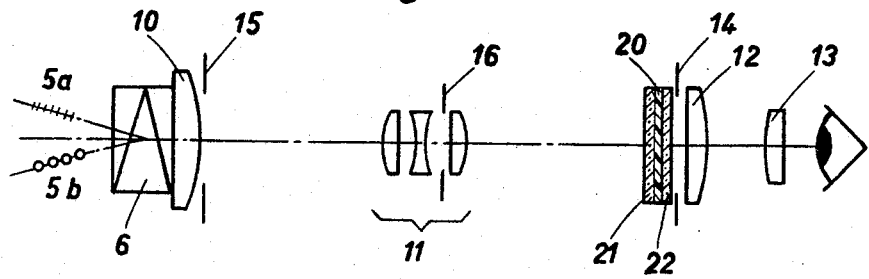
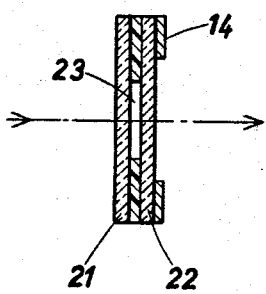
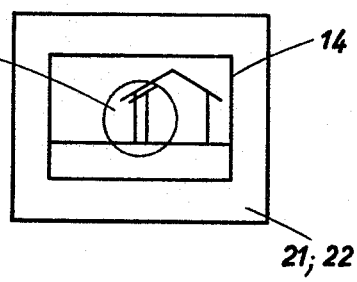
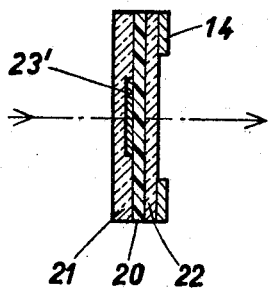
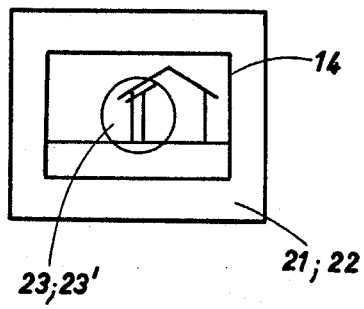

Sept. 27, 1966     H. SAUER     3,274,881
COMBINED VIEWFINDER AND RANGEFINDER WITH COMPOSITE
BIREFRINGEMENT PRISM ASSEMBLY
FOR PHOTOGRAPHIC CAMERAS
Filed Nov. 30, 1961     4 Sheets-Sheet 4

INVENTOR:
Hans Sauer,
BY Singer, Stern & Carlberg
Attorneys.

United States Patent Office 3,274,881
Patented Sept. 27, 1966

3,274,881
COMBINED VIEWFINDER AND RANGEFINDER WITH COMPOSITE BIREFRINGEMENT PRISM ASSEMBLY FOR PHOTOGRAPHIC CAMERAS
Hans Sauer, Heidenheim (Brenz), Germany, assignor to Carl Zeiss, Oberkochen, Wurttemberg, Germany
Filed Nov. 30, 1961, Ser. No. 156,037
Claims priority, application Germany, Dec. 6, 1960, Z 8,411; Feb. 24, 1961, Z 8,574
3 Claims. (Cl. 88—2.6)

The invention relates to a combined viewfinder rangefinder, and more specifically to a rangefinder in which the combination of the two partial beams superimposed in the ocular image plane is carried out by a beam splitter, the components of which are made wholly or in part of optically double refractive material.

It is an object of the instant invention to combine a mirror reflex image finder of a photographic or motion picture camera with a rangefinder.

It is a further object of the invention to provide means for range measuring in accordance with the coincidence principle which is carried out only in a portion of the viewfinder field, and preferably in a central portion thereof. By virtue of this arrangement, the observer will save time while controlling the focusing and his attention is not unduly distracted from the other required observations and operations.

It is well known in mirror reflex cameras to provide for the purpose of measuring the distance according to the coincidence principle a so-called indicator in a small central portion of the viewfinder image plane. The indicator is composed of two optical wedges of equal but opposite deflection, the wedges abutting along a sharply defined dividing line which extends perpendicularly to the base of the two wedges. The light rays from both sides of the dividing line which reach the eye through the two indicator prisms, pass through the entrance pupil of the objective lens with a space between them which is determined by the magnitude of beam deflection caused by the wedges and by the focal length of the objective; the objective lens creates a real image of the object in the image plane of the viewfinder. The images of an edge as observed at either side of the dividing line are parallactically offset, as long as the image produced by the objective lens does not coincide with the coincidence plane of the two wedges. For the purpose of focusing the objective lens, the cameras extension is varied until coincidence of the two images viewed through the wedges is obtained and the two portions of the image of an edge as viewed at either side of the dividing line are precisely aligned with respect to each other.

A range measurement or focusing according to the mentioned split image principle with the aid of a wedge indicator requires the presence of edges or lines in the central portion of the object the image of which extends across the dividing line. It is therefore not possible without shifting the camera to check the sharp focusing of such portions of the object whose images are projected above or beneath the dividing line. The rangefinding operation is furthermore confined to the central portion of the viewfinder image field, in which the wedge indicator is located. Various attempts have been made to employ the principle of the coincidence rangefinder also in mirror reflex cameras. In a rangefinder operating according to the coincidence principle, two images of the object are superimposed, so that the coincidence of the two images may be observed not only adjacent a dividing line but in any portion of the viewfinder image field. This problem is solved by replacing the aforementioned wedge indicator by a beam-splitter composed of two partial prisms which together form a plano-parallel plate, at least one of the two prisms being made of optically double refractive material, which preferably has a single optical axis. Owing to the different refraction of light rays having different directions of oscillation, a ray of natural light impinging on the prism surface, which extends obliquely to the direction of the light ray, is split into two rays that are deflected to a different extent and differently polarized. If a prism combination of the indicated nature is disposed in the viewfinder image plane, it will unite light rays which have passed the entrance pupil of the viewfinder objective lens at appreciable distance from each other. The combination affords thus a coincidence rangefinding. Prism combinations of the aforementioned type having one or more partial prisms made of optically double refractive material are well known in the form of polarization prisms, as indicated by Rochon, Senarmont, Ahrens, Abbe and others. When used as polarizers in microscopy, they are commonly designed so that one beam passes through the polarizer without deflection and with a minimum of aberration, while the other beam is not utilized, but deflected as far as possibe, so that the beam may easily be eliminated, if the prisms are, for instance, used as ocular polarizers. As to the design of polarization photometers, in this instance, polarization prisms of the Wollaston type are commonly used, with the aid of which a vertically incoming beam is split into two beams that are deflected approximately equally in opposite directions. No attention has been given to the aberrations caused by the Wollaston prism, since the important consideration in a photometer is only the uniform illumination of the viewfinder field and not the projection of any objects. Moreover, these aberrations are relatively small, because the Wollaston prism, which is located close to the viewfinder diaphragm, is passed by a beam of only small aperture, and further, because the required deflections are small, and because the viewer field, as measured at eye level, is at most 5° and therefore also small.

The situation is an entirely different one if a polarization prism according to Wollaston is to be disposed in the viewfinder image plane of a mirror reflex camera in the manner hereinbefore described, for the purpose of carrying out a rangefinding operation in accordance with the coincidence principle. Since the accuracy of the rangefinding or the focusing depends, for a given focal length of the viewfinder objective lens, on the magnitude of the spacing with which the rays, which have been united by the Wollaston prism, pass through the entrance pupil of the viewfinder objective lens, it is desirable to select the angles of refraction $\rho$ of the partial prisms relatively large, so that the angle $\epsilon$ formed between these rays will be sufficiently large. It has been found that this angle $\epsilon$ is to be not smaller than 5°, while values of $\epsilon=10°$ or more are desirable if the rangefinding is to be carried out with objective lenses having a large relative aperture. The geometric locations of the seeming coincidence of the rays are disposed in the prism in a plane, which is inclined at an angle $\chi$ against the entrance and exit area for the rays. The angle $\chi$ is approximately twice as large as the angle $\epsilon$. It is therefore necessary to mount the prism at an inclination to the optical axis of the viewfinder light beam. Furthermore, the prism has to be small in size, because the aberrations caused by the prism are substantially increased proportionally to the magnitude of the light path differences between the light rays united by the Wollaston prism, and further proportionally to the magnitude of the angle $\rho$ or $\epsilon$. The Wollaston prism is therefore only suitable to carry out a rangefinding operation within a very small central portion of the viewfinder field.

The instant invention overcomes the aforementioned difficulties. The invention employs a prism combination comprising at least three partial prisms which are made, in whole or in part, of optically double refractive material and have refractive areas which are so oriented that the geometric locations of the apparent ray coincidence are disposed in a plane which is approximately perpendicular to the direction of the optical axis of the viewfinder. Preferably, the magnitude of the aberrations is also reduced. It is therefore feasible to dimension the prism combination sufficiently large, so that it will extend, when used in the viewfinder of a mirror reflex camera, over a substantial portion of the viewfinder image field or even over the entire field, thus making possible the rangefinding over the entire viewfinder image field. In some instances, it will, however, be desirable to limit the portion of the viewfinder image field used for the rangefinding to only a part of the field, preferably a central part thereof, so as to avoid thereby that the rangefinding takes up relatively much time and unduly detracts from the time available to the observer for carrying out other required camera adjustments. The invention involves means permitting the range finding within such a limited area of the viewfinder image field.

The user of cameras equipped with a combined viewfinder and rangefinder sometimes prefers a split image rangefinder instead of a coincidence image rangefinder. An alternative embodiment of the invention therefore contemplates the use of a beam-splitter made of optically double refractive material in a rangefinder using the split image principle. An additional advantage attained thereby is the possibility that the boundary along which the adjustment according to the split image principle is carried out, may be of any desired form. In a further variation of the invention, coincidence image indication and split image indication may be combined in any desired manner.

Other objects and advantages of the invention will become apparent from the following description taken in conjunction with the accompanying drawings, in which.

Figure 2:
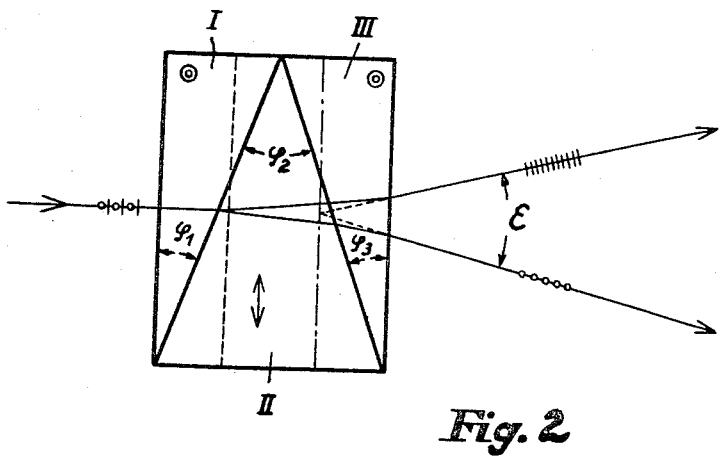
FIGURE 2 illustrates a prism combination employed as a beam combiner in accordance with the present invention.

FIGS. 3 and 4 indicate the positioning of a beam-splitter, as shown in FIG. 2, in the viewfinder ray path, and, FIGS. 5 to 17 illustrate various arrangements in which a beam splitter is combined with planar polarizers interposed in the optical path of the viewfinder.

Figure 1:
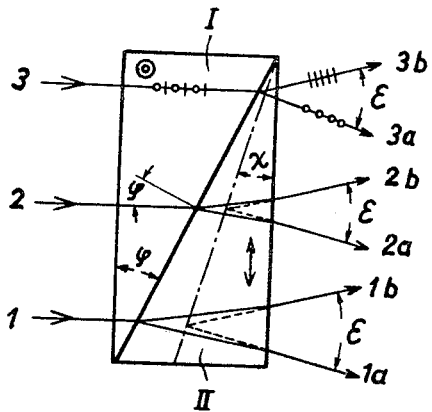
FIGURE 1 illustrates a prism combination according to the prior art.

FIG. 1 indicates diagrammatically the path of three light rays 1, 2 and 3 through a Wollaston prism made of two partial prisms I and II having a prism angle $\varphi$ and composed of a material having a single optical axis. In prism I, the optical axis is positioned parallel to the light entrance surface and perpendicular to the plane of the paper, as illustrated by the small concentric circles. In prism II, the optical axis is parallel to the light exit surface and lies in the plane of the paper, as illustrated by the double arrow. The component of the incident light rays which oscillates in the direction of the optical axis comes into an optically denser medium when passing from prism I to prism II and is deflected, at the boundary between the prisms I and II, toward the axis of incidence, whereas the component oscillating perpendicularly to the optical axis passes from the denser into an optically thinner medium and is therefore deflected in a direction away from the axis of incidence. The incident light rays are thus split into two rays $a$ and $b$, which appear to be deflected, after their exit from the prism, approximately equal but opposite angular amounts from the extension of the incident ray path. The sum of these angular amounts is denoted as deflection angle $\epsilon$.

The different polarization of the two outcoming rays has been indicated only on ray 3 by means of circles and dashes, but is of no consequence in the instant use of the prism combination. It is, however, important that the seeming geometrical locations of the ray splitting, that is the intersections of the rearward extensions of the outcoming rays, are located on a plane disposed at an angle $\chi$ to the exist surface, as indicated in FIG. 1 in dot and dash lines. In a Wollaston prism made of calc-spar the angle $\chi$ is approximately defined by the equation, $$tg\chi = -0.64 \cdot tg\ \varphi$$

Conversely, if a Wollaston prism is used in a coincidence rangefinder to unite two rays, the dot and dash line disposed at an angle $\chi$ will indicate the seeming position of the geometric locations of the unison of the rays with respect to a plane perpendicular to the axis of the rangefinder. However, coincidence may only be obtained for such image points which are disposed on a line extending perpendicularly to the plane of the paper. By shifting the prism about an axis which is perpendicular to the plane of the paper, it is possible to have the plane, on which the geometrical locations of the apparent unison of rays are disposed, sufficiently accurately coincide with the real image treated by the viewfinder objective lens. Satisfactory results are obtained only if the prism is relatively small and covers only a central portion of the viewfinder image field, or a small strip-shaped portion of the image field and which extends perpendicularly to the plane of the paper, as otherwise an unduly large astigmatism will occur. In this connection, it is of no relevance that in an arrangement where the direction of the light rays is reversed with respect to FIG. 1, the incident natural light will be split into two partial rays which are polarized perpendicularly with respect to each other, so that only the components having the oscillation directions indicated on ray 1 will take the illustrated course. The ray components which respectively oscillate perpendicularly with respect to the illustrated components will be eliminate from the viewfinder ray path by suitable means.

FIG. 2 illustrates diagrammatically a prism combination made of three parts, in which subsequent deflections at the boundaries of the prisms I and II, and II and III—which form approximately equal angles $\varphi$ with a plane perpendicular to the incident light rays—are used in order to have the plane in which the geometric locations of the apparent unison of rays are disposed extend substantially perpendicularly to the direction of the incident light rays, so that the aforementioned angle is small enough to be disregarded. In a prism made of calc-spar and having optical axes as indiacted in FIG. 2, with $\varphi_3$ being made equal to $\varphi_1$, and $\varphi_2 = 2\varphi_1$, the following data for $\epsilon$ and $\chi$ as function of $\varphi$ have been obtained with the light of the yellow Na-line:

| $\varphi$ | $\epsilon$ | $\chi$ |
|---|---|---|
| 10.3° | 7.17° | 0.007° |
| 14.3° | 10.07° | 0.015° |
| 20° | 14.41° | 0.043° |

In a Wollaston prism made of calc-spar and having a prism angle of $\varphi = 20°$, the two outcoming rays form an angle $\epsilon = 7.18°$ between each other, and $\chi = 6.415°$. The prism combination shown in FIG. 2 when used in a coincidence rangefinder, that is for the reversed direction of the light ray path, is much more favorable, not only because the angle $\chi$ is three decimal points smaller, but also because the angle $\epsilon$ is twice as large—the other dimensions remaining unchanged—so that a double accuracy of measurement is to be expected.

If a prism of the hereinbefore described type is used in the viewfinder image plane of a substandard film size reflex camera, the prism may be dimensioned to take up the area of the entire image field, so as to make possible that a coincidence rangefinding be carried out at any point of the viewfinder image field.

In some instances, it is expedient to select different materials for the prisms shown in FIG. 2. The two outermost prisms I and III may be made of glass and the inner prism II of optically uni-axial material. This combination will be particularly suitable if it is contemplated, for reasons of economy, to use for the inner prism a hydroscopic material, such as NaNO$_3$, instead of calcspar. According to an alternative embodiment, more than three partial prisms may be used and combined in such manner that the geometric locations of the apparent unison of rays have a predetermined orientation, as may be desired. If it is desirable to preclude any deflection of the optical axis of the viewfinder ray path caused by a combination of K prisms, the first and the K-*th* prism will preferably have a pris mangle $\varphi$ while the (K−2) inner prisms have the prism angle $2\varphi$. Furthermore, the orientation of the optical axes will be such that the axes are in all of the prisms parallel to the entrance surface and, with respect to the direction of the ray path, alternately and perpendicular to the edges of the partial prisms. By means of such an orientation, every deflection will contribute to increase the angle.

FIG. 3 illustrates diagrammatically the arrangement of the hereinbefore described prism combination in the viewfinder ray path of a mirror reflex camera. Reference numeral 4 designates the adjustable viewfinder objective lens. 5a and 5b are two rays of the two partial ray paths which are deflected by the prism combination 6 in the direction of the optical axis. 7 denotes a diaphragm limiting the viewfinder image field, 8 a field lens and 9 the eyepiece lens. Normally, an image inversion is carried out between the elements 4 and 6 or 8 and 9, by well known means, so as to enable an observer to view the object in its proper position.

The direction of oscillation of the light in the two partial ray paths which are deflected by the prism combination in the direction of the optical axis and superimposed behind the eyepiece 9 in a common exit pupil, is indicated in the two partial rays by means of circles and dashes. Similarly, the light of the two partial images which are superimposed by the prism combination 6 into a coincidence image, and also the light of the two superimposed pupils of the two partial paths are polarized linearly and perpendicularly with respect to each other. The direction of oscillation in the partial ray path 5a is parallel to the plane of the paper, and it is perpendicular to the plane of the paper in the partial ray path 5b. Those components of the light which respectively oscillate perpendicularly to the aforementioned planes, that is, in ray path 5a the component oscillating perpendicularly to the plane of the paper and in the ray path 5b the component oscillating parallel to the plane of the paper, are deflected by the prism combination 6 in the opposite direction and do therefore not reach the eye of the observer. If the ocular lens 9 is sufficiently large in diameter, they are visible in the form of so-called side pupils which are disposed at either side of the two partial pupils that are superimposed by the prism 6 and determine the observation of the coincidence image.

FIG. 4 illustrates the application of the prism combination in a viewfinder ray path including lens inversion. This solution is particularly desirable where the real image produced by the viewfinder objective lens is located an appreciable distance away from the observation aperture. In FIG. 4, reference numeral 10 denotes a field lens, 11 the inversion system, 12 a further field lens, and 13 the eye lens of the ocular, with which the real image produced by the inversion system 11 is viewed. The restriction of the viewfinder field is accomplished by means of the diaphragm 14. The diaphragm 15, which is projected by the inversion system 11 approximately into the plane of the diaphragm 14, is provided only for the purpose of keeping away diffused light originating at the marginal portions of the prism combination from the viewfinder ray path. The field lens 10 projects the entrance pupil of the viewfinder objective lens (not indicated) into the aperture of the diaphragm 16, the latter being positioned close to the inversion system 11.

The prism combination 6 deflects the component which oscillates parallel to the plane of the paper in the partial ray path 5a and also the component which oscillates perpendicularly to the plane of the paper in the partial ray path 5b, in the direction of the optical axis. Thus, the two pupils associated with the two partial rays which form the coincidence image viewed by the observer are superimposed in the aperture of the diaphragm 16. Those light components which respectively oscillate perpendicularly to the aforementioned rays form rays which are laterally deflected by the prism 6 in opposite directions, and for approximately equal amounts, and which are eliminated by means of the diaphragm 16. Upon observation of the exit pupil, which is disposed approximately at the eye level, preferably with a magnifying lens, only two partial pupils will be seen superimposed in a common exit pupil, and which originate from that component in partial ray path 5a that oscillates parallel to the plane of the paper, and that component in partial ray path 5b that oscillates perpendicularly to the plane of the paper. The so-called side pupils which are encountered in systems using optically double refractive prisms are thus eliminated by the diaphragm 16 and do not interfere with the observation of the coincidence image.

In mirror reflex viewfinders for single lens mirror reflex cameras, it is common practice to interpose a semitransparent surface into the light ray path coming from the camera objective lens, so as to divide out a fraction of the light rays for use in the viewfinder, for instance by means of a divided cube having diagonal surfaces provided with a semi-transparent coating. In order to keep the cost of the viewfinder low, it is advisable to restrict the apertures of the two partial rays to apertures of 1:8 or less, as the apertures of the partial rays will determine only the brightness of the viewfinder image, and will have no effect upon the accuracy of the measurement, which depends substantially only upon the magnitude of the angle $\epsilon$ formed between the two partial rays. Accordingly, if the hereinbefore described prism combination is used in a single lens mirror reflex camera, it will be advisable not to provide the entire diagonal surface of a divider used for the division of the light rays with a semi-transparent coating, but only those portions from which light rays are directed, by way of the two partial ray paths led together by the prism combination 6, into the two partial pupils that are superimposed into a common exit pupil.

The accuracy of measurement of the viewfinder rangefinder, according to the invention, depends on the magnitude of the spacing between the two partial rays, which are combined by the prism combination, when they enter into the viewfinder objective lens. From the foregoing, it would appear desirable to dimension the prism so that the prism angles are made as large as possible so as to obtain thereby also a large angle $\epsilon$. This is, however, opposed by the space requirements of the prism combination. In some instances, it will be more advantageous to employ a prism combination having relatively small prism angles, and correspondingly small angles formed between the two partial rays, and to obtain the desired increase in the accuracy of measurement by additional means positioned in a manner known as such in front of the viewfinder objective lens, such as mirrors or orthorhombic prisms, so as to increase the spacing between the two entrance pupils (base magnification). The same effect may be obtained by means of an increase in the telescopic magnification of the viewfinder system, so that it will sometimes be advisable to provide means in front of the viewfinder objective lens, such as an afocal telescopic attachment, for the purpose of increasing the telescopic magnification and thus the accuracy of the measurement.

FIG. 5 illustrates diagrammatically the construction of a combined viewfinder and rangefinder with a polarization filter. Reference numerals 5a and 5b designate light rays originating from the center of the eccentric partial pupils and impinging on the beam-splitter 6 which consists of optically double refractive material. Reference numeral 10 denotes an image field lens and 11 an inversion system by means of which a real image is produced in the plane of the field diaphragm 14. This image may be viewed through the ocular composed of the lenses 12 and 13.

In this form of the invention, a polarization filter 20 is interposed between two glass plates 21 and 22 and positioned in the real viewfinder image plane, that is, in close proximity to the field diaphragm 14. If the polarizer is oriented in such a way that only light rays of the one or the other direction of oscillation (5a or 5b) are allowed to pass, the portion of the viewfinder field covered by the polarizer will appear as being illuminated by only one of the partial pupils. A rangefinding by means of image coincidence is then no longer possible, merely the common focusing may be carried out, whereby the accuracy of the same depends on the aperture of the partial pupil and the over-all telescopic magnification of the viewfinder.

If the polarizer, which is in the form of a flat sheet, is provided with a central aperture 23, for instance produced by a punching operation, as diagrammatically illustrated in FIG. 6, then the viewfinder image will contain a central portion in which the images produced by the two partial pupils are superimposed. The central portion may thus be used for rangefinding based on image coincidence, as diagrammatically indicated in FIG. 7.

If it is desirable that the brightness in the central portion of the viewfinder field, which is used for the range measurement, is the same as the brightness in the surrounding portion, the invention purposes the employment of a foil 23' made of optically double refractive material and disposed adjacent the polarizer at that side thereof which faces the incoming light rays. The foil causes for both oscillation directions a phase retardation in the amount of λ/4 and insures that both oscillation directions are allowed to pass through the central portion covered by the double refractive foil 23', with the result that coincidence image indication is obtained. FIG. 8 diagrammatically illustrates such a polarization foil 20 which is combined with the double refractive foil 23', and FIG. 9 indicates the effect obtained in the viewfinder field. The aforementioned foils are preferably cemented between the two glass plates 21 and 22 or cemented onto the planar face of the field lens 12 forming a part of the ocular system. The size and shape of the portion of the viewfinder image field reserved for the rangefinding are determined by the dimensions of the double refractive foil. In order to insure that the boundaries of this field used for the rangefinder appear sharp together with the image of the object produced by the viewfinder, it is necessary that the double refractive foil 23' be positioned in that plane in which the inversion lens 11 creates a real viewfinder image. The polarizer 26 may, however, be located at any desired location in the ray path between the foil 23' and the eye. It is also possible to provide mechanical means adapted for selectively interposing or retracting the polarizer from the ray path, so that either only a portion or the entire viewfinder field is used for the range measurement.

Figure 10:
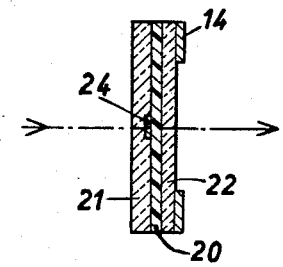
Figure 11:
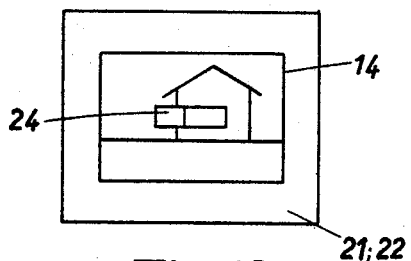
Figure 12:
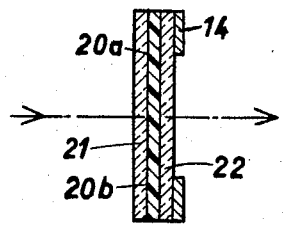
Figure 13:
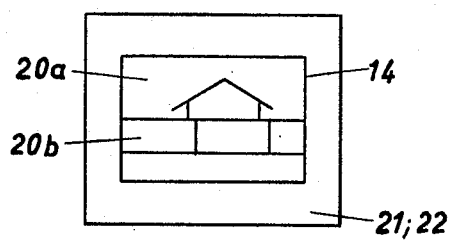

In a further embodiment of the invention, in which it is desired to obtain a split image indication, the polarizer, which is interposed in the ray path, is combined with a double refractive foil 24, as shown in FIG. 10. The foil 24 is located in the real viewfinder image plane and causes a phase retardation of λ/2. Consequently, in the portion of the viewfinder field which is covered by the double refractive foil, the light of the first pupil will be effective, for instance, of the pupil 5a, whereas in the remaining portion only light of the other pupil, such as 5b, will be effective. Thus image elements which extend perpendicularly to the double refractive foil may be used to obtain a split image indication, as illustrated in FIG. 11. The same effect is obtained, as shown in FIG. 12, when the polarizer foils 20a and 20b are disposed in the viewfinder image plane, either in side by side relation or one above the other and abutting in a sharply defined dividing line, the polarized planes of the foils being perpendicular to each other and therefore parallel and perpendicular to the oscillation directions of the partial rays 5a and 5b. The resulting viewfinder image field is illustrated in FIG. 13.

Figure 14:
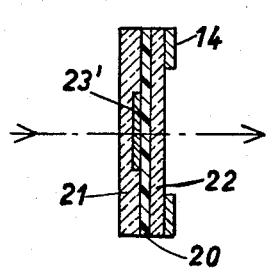
Figure 15:
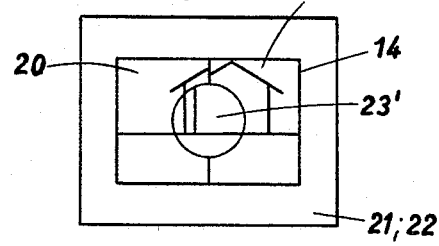

FIG. 14 illustrates the possibility of combining split image indication and coincidence image indication in the viewfinder field. To this end, two polarizers are disposed in side by side relationship in the viewfinder image plane and abut each other in a sharply defined vertically extending dividing line. The polarized planes of the two polarizers extend perpendicularly to each other and are respectively parallel and perpendicular with respect to the oscillation directions of the two partial rays 5a and 5b. A circular foil 23' made of double refractive material, which causes a phase retardation of λ/4, is disposed in front of the polarizers at that side thereof which faces the incoming light rays. The effect obtained by this arrangement is diagrammatically illustrated in FIG. 15. The viewfinder field is bounded as in the previous figs. by the field diaphragm 14. In the central circular inner field, which is determined by the λ/4-foil 23', a coincidence image indication is obtained in the same way as in the embodiment illustrated in the FIGS. 8 and 9. The dividing line between the two polarizers, which extends vertically through the center of the viewfinder image, is used for the split image indication along edges which extend inclined to the dividing line.

Figure 16:
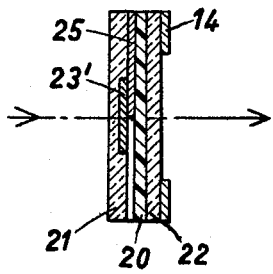
Figure 17:
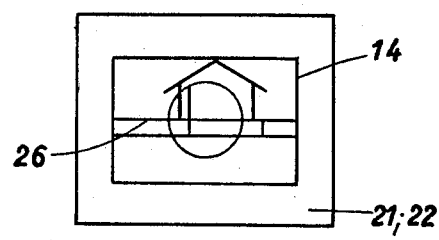

FIG. 16 illustrates a further possibility of combining coincidence and split image indication in the viewfinder field. To this end, a double refractive λ/2-foil 25 is disposed adjacent the polarizer 20 at that side thereof which faces the incoming light rays; the foil 25 covers the upper half of the viewfinder field down to the horizontal boundary line designated by reference numeral 26 in FIG. 17. By virtue of the λ/2-foil 25, the lower half of the viewfinder field appears to be illuminated, similar to the conditions in a sectional image rangefinder, by one partial pupil only, for instance, 5a, while the upper half appears to be illuminated only by the other partial pupil, for instance 5b. Thus, an edge of an object extending vertically to the aforementioned horizontal boundary line 26, such as the right-hand edge of the diagrammatically indicated housing, appears in the viewfinder image field in the form of two parallactically offset edges, as long as the range adjustment is not completed, as will be seen in FIG. 13. Further, a circular double refractive foil 23' is disposed adjacent the polarizer 20 at the side thereof facing the incoming light rays and adapted to cause a phase retardation of λ/4. It is of no significance whether the foil 23' is disposed in front of or rearwardly of the foil 25 with respect to the incoming light rays, as long as it is placed in front of polarizer 20. As a result of the provision of the λ/4-foil, both partial pupils will be effective in the central portion of the viewfinder field covered by the foil. A true coincidence image indication is obtained, as the two partial images are superimposed in the central portion covered by the λ/4-foil 23'.

The embodiments illustrated in the FIGS. 6 to 17 are to be considered merely as examples. In order to insure that the boundaries of the field used for the measurement will appear sharp in the viewfinder together with the object, it is merely necessary to locate the double refractive foils in a plane, in which a real viewfinder image is created. In viewfinders having one inversion lens system, this will normally be the second real viewfinder image plane. The polarizer may be disposed separate from the foils at any desired location in the light ray path rearwardly of the double refractive foils. If the system is restricted to coincidence image indication, and the requirement dropped that the boundaries of the field used for the measurement appear sharp together with the viewfinder image, it will also be possible to provide the polarizer 20 immediately in front of or rearwardly of the beam-splitter 6, the double refractive foil 23' being disposed adjacent the polarizer at the side thereof facing the incoming light rays.

What I claim is:

1. A combined viewfinder and rangefinder for photographic cameras, comprising a finder objective, an image inverting system, and an eyepiece lens forming an optical system with an optical axis along which said objective is movable, a beam combiner arranged on the optical axis between the objective and the image inverting system, said beam combiner being composed of three triangular shaped prism elements arranged in contact in alternate opposed relation, of which at least two consist of optically double refractive material with their optical axes normal to the axis of the optical system and angularly displaced one from the other 90°, said triangular prisms being arranged so that the outer walls of the outermost prisms extend in parallel relation and perpendicular to the axis of the optical system, said beam combiner being located on the optical axis at a position encompassing the focal plane of the finder objective, said beam combiner being operative to deviate image rays forming two partial ray paths from opposite lateral portions of the finder objective into coincidence when the finder objective is properly focused, the coincidence focal plane of the beam combiner being perpendicular to the optical axis, the partial ray paths being symmertical to the optical axis and having an included angle of at least 5°, at least one polarizer located on the optical axis adjacent the eyepiece focal plane, covering the entire eyepiece image and oriented to block the polarized light component of one partial ray path and transmit the polarized light component of the other partial ray path and a birefringent element of reduced size combined with said polarizer and disposed adjacent the side of the polarizer facing the incoming light rays and producing a phase retardation of $\lambda/4$ in the path of the light rays to define a reduced coincidence image rangefinding area.

2. A combined viewfinder and rangefinder for photographic cameras, comprising a finder objective, an image inverting system, and an eyepiece lens forming an optical system with an optical axis along which said objective is movable, a beam combiner arranged on the optical axis between the objective and the image inverting system, said beam combiner being composed of three triangular shaped prism elements arranged in contact in alternate opposed relation, of which at least two consist of optically double refractive material with their optical axes normal to the axis of the optical system and angularly displaced one from the other 90°, said triangular prisms being arranged so that the outer walls of the outermost prisms extend in parallel relation and perpendicular to the axis of the optical system, said beam combiner being located on the optical axis at a position encompassing the focal plane of the finder objective, said beam combiner being operative to deviate image rays forming two partial ray paths from opposite lateral portions of the finder objective into coincidence when the finder objective is properly focused, the coincidence focal plane of the beam combiner being perpendicular to the optical axis, the partial ray paths being symmetrical to the optical axis and having an included angle of at least 5°, at least one polarizer located on the optical axis adjacent the eyepiece focal plane, covering the entire eyepiece image and oriented to block the polarized light component of one partial ray path and transmit the polarized light component of the other partial ray path and a birefringent element of reduced size combined with said polarizer and disposed adjacent the side of the polarizer facing the incoming light rays and producing a phase retardation of $\lambda/2$ in the path of the light rays, to define split image rangefinding areas abutting at an edge portion of the birefringent element.

3. A combined viewfinder and rangefinder for photographic cameras as set forth in claim 1 in which said polarizer and birefringent element are located adjacent the surface of an eyepiece field lens.

References Cited by the Examiner

UNITED STATES PATENTS

| | | | |
|---|---|---|---|
| 942,393 | 12/1909 | Konig | 88—1 |
| 2,171,627 | 9/1939 | Hartinger | 351—8 |
| 2,174,308 | 9/1939 | Hartinger | 351—8 |
| 2,601,175 | 6/1952 | Smith | 88—39 |
| 2,730,008 | 1/1956 | McGinn | 88—14 |
| 2,969,706 | 1/1961 | Rosier et al. | 88—2.4 |
| 3,001,438 | 9/1961 | Warthen | 88—1 X |

FOREIGN PATENTS

| | | |
|---|---|---|
| 299,606 | 8/1919 | Germany. |
| 799,348 | 8/1958 | Great Britain. |

OTHER REFERENCES

Strong Concepts of Classical Optics, textbook, published 1958. Pp. 389–391 cited.

DAVID H. RUBIN, *Primary Examiner.*